Oct. 12, 1954     E. A. WARD     2,691,299

FUEL PUMP TESTER

Filed April 5, 1951

INVENTOR
EDGAR A. WARD
BY
ATTORNEY

Patented Oct. 12, 1954

2,691,299

UNITED STATES PATENT OFFICE 2,691,299

FUEL PUMP TESTER

Edgar A. Ward, Schenectady, N. Y., assignor to American Locomotive Company, New York, N. Y., a corporation of New York Application April 5, 1951, Serial No. 219,475

4 Claims. (Cl. 73—118)

This invention relates to apparatus for testing fuel pumps for compression-ignition engines.

Test apparatus is known in which a fuel pump is installed in a test fuel system and driven to deliver fuel at predetermined outputs so that the pump rack and plunger helix may be properly adjusted. A pump to be tested is installed in the apparatus and actuated by a motor-driven cam shaft to simulate actual operative conditions. The pump is first driven under "full fuel" conditions, and then under "idle" conditions, and the fuel is directed into graduated beakers. Since the desired outputs of the pump at "full fuel" and "idle" conditions are known, the rack and plunger helix may be adjusted or calibrated as the beaker quantities may indicate.

Such prior art testing apparatus includes a special calibrating nozzle to receive the pump output under conditions simulating those of a fuel injector. This nozzle includes a large orifice plate for a "full fuel" run and an interchangeable small orifice plate for an "idle" run. To change the plates during each test has required the disassembly and reassembly of the nozzle. This is an inconvenient and time-consuming operation.

It is the principal object of the present invention to provide a novel calibrating nozzle for fuel pump testing apparatus in which complete testing may be effected without the necessity of disassembly of the nozzle. Still a further object is to provide such a nozzle having a spring-loaded plate adapted to permit successive test runs under "full fuel" and "idle" conditions. The plate, which is normally disposed against a spacing means by the spring, permits fuel to pass through it under "idle" conditions simulating those of a fuel injector; but the spring characteristics are such that the plate is cleared of the spacing means by fuel pressure and hence inactivated when the test proceeds under "full fuel" conditions.

Other and further objects of this invention will appear from the following description, the accompanying drawings, and the appended claims.

Figures 1, 2:
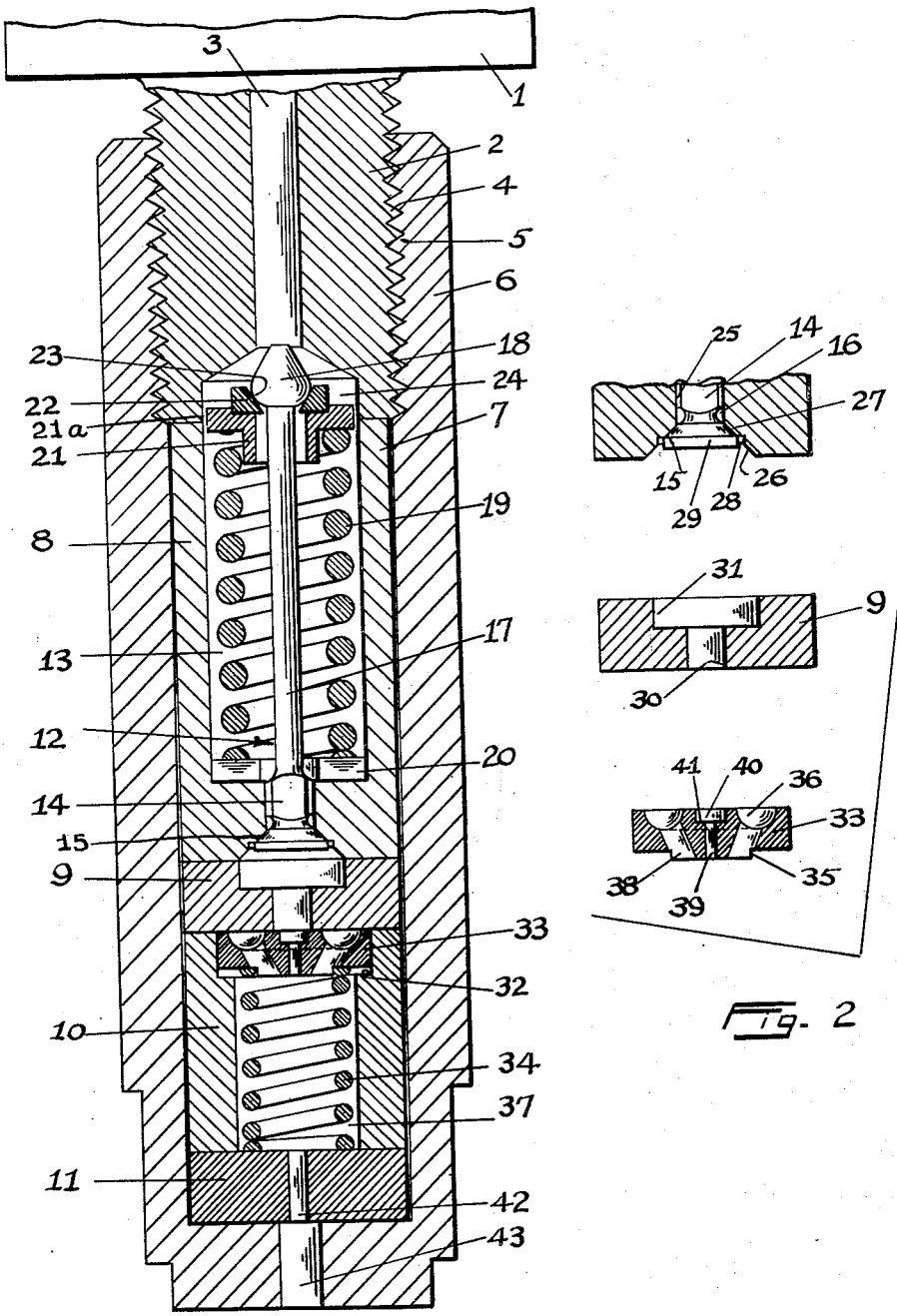
Fig. 1 is a view in longitudinal section of a nozzle embodying the construction of the invention.
Fig. 2 is an exploded view of the central portion of the nozzle showing details of the invention more clearly.

Referring now to the drawings, my invention is shown applied to a conventional calibrating nozzle. Nozzle holder 1 is in communication with tubing (not shown) leading from the pump to be tested. Nozzle holder extension 2 of reduced diameter has a fuel passage 3 therethrough and is threaded at 4 for mating engagement with corresponding threading 5 on special nut 6 which serves to hold the assembly together. Within bore 7 of nut 6 are arranged valve housing 8, spacing means 9, spacer sleeve 10, and large orifice plate 11. When nut 6 is threaded into position, these elements are clamped into fluid-tight assembly.

A valve, generally indicated at 12, extends through chamber 13 of housing 8 and comprises a fluted head 14, a tapered seating surface 15, a neck 16 connecting the head and seating surface, a stem 17, and a knob 18. Coil spring 19 has the same characteristics as the valve spring in a fuel injector of the type used in an injection system of which the pump under test forms a part. Spring 19 is disposed in chamber 13 and rests upon washer 20. It extends upwardly and carries a retainer 21, the periphery of which is spaced from the wall of chamber 13 to provide an annular passage 21a for the flow of fuel. Retainer 21 is recessed at its upper end to support a locking ring 22 for knob 18. Ring 22 has a tapered central aperture 23 to engage valve knob 18. In normal closed position of the valve, as shown in Fig. 1, valve retainer 21, locking ring 22, and valve knob 18 extend into a recess 24 formed in the lower end of holder extension 2. The spring 19 is fully extended and knob 18 is preferably spaced from extension 2 when the valve is closed. The lower end of housing 8 has a valve guide bore 25 (see Fig. 2) and adjacent thereto a downwardly and outwardly tapered wall 26, the upper portion of which serves as a valve seat 27. Wall 26 is interrupted by an annular clearance recess 28 opposite a cylindrical portion 29 formed at the bottom of the valve. The arrangement of the cylindrical portion 29 opposite the recess 28 facilitates the flow of fuel when valve 12 opens.

It will be apparent from the drawings, as thus far described, that the pressure of fuel passing through passage 3, chamber 13, and guide bore 25, will force the valve downwardly to open position against the bias of spring 19. This description covers a portion of a conventional calibrating nozzle and does not, as such, form a part of the invention.

Reference is now made to Fig. 2 where it is seen that spacing means 9 has a central bore 30 and is counterbored at 31 to form a reservoir for fuel passing the valve. Adjacent spacing means 9 and arranged within the annular recess 32 formed in the upper part of sleeve 10 is a small orifice plate 33 which is normally biased upwardly against spacing means 9 by spring 34. Plate 33 is formed with a boss 35 which centers the spring. An annular groove 36, formed in the upper face of plate 33, is in communication with chamber 37 by means of a plurality of downwardly and inwardly directed ducts 38 only two of which show on the drawing. An axial bore or orifice 39 is formed in plate 33 and opens at its upper end into a central recess 40, the bottom face 41 of which functions as a pressure surface as hereinafter described. Large orifice plate 11 has an axial bore or orifice 42 to establish communication between chamber 37 and the larger bore 43, the latter serving as a spill for fuel to be caught in a graduated beaker (not shown) for test measurement.

Bores 39 and 42 have critical dimensions. Bore 39 permits the passage of fuel therethrough at the exact rate at which it would be supplied by the pump to an injector when the engine is idling under actual operating conditions. Bore 42 permits the passage of fuel therethrough at the exact rate at which it would be supplied to an injector when the engine is operating at full load. Such an arrangement provides the nozzle assembly with fuel passage means exactly simulating the fuel passage means in a conventional injector.

It has been conventional practice first to make a "full fuel" test run with a large orifice plate in position in the nozzle, then disassemble the nozzle, replace the large orifice plate with a small orifice plate, reassemble the nozzle, and then conduct an "idle" run. Both such runs may now be conducted without the necessity of such nozzle disassembly and interchange of the orifice plates, since both orifice plates are permanently assembled in the nozzle and are enabled to function automatically because of the arrangement of the invention.

In the operation of the new and improved nozzle of the invention, when a test is conducted, the fuel pump rack and plunger are positioned in approximately "full fuel" position and the motor is started at a predetermined rate, say 500 R. P. M., to feed fuel to the pump under test. A conventional run of say exactly 300 pump strokes is conducted. The fuel will advance from the pump through standard tubing and through the nozzle holder 1 into the nozzle assembly of the invention. Valve 12 will open, as explained, and the fuel will pass through spacing means 9 into recess 40. Bore 39 will throttle the fuel stream so that fuel pressure on surface 41 will force plate 33 downwardly by overcoming the bias of spring 34. The fuel will then flow radially into groove 36 and through ducts 38 into chamber 37 and thence out bores 42 and 43. That is to say, plate 33 is inactivated so that "full fuel" flow is permitted to pass through the nozzle assembly, after valve 12 is opened, in the same manner that "full fuel" flow passes through the pressure chamber and sump of a fuel injector to its atomizer. The fuel is collected in a graduated beaker (not shown) positioned adjacent bore 43. Adjustments of the rack and plunger can be made as the amount of collected fuel may indicate. In the case of the "idle" run, bore 39 will permit the passage of fuel therethrough. Spring 34, plate 33, and bore 39 are so designed that the force of the fuel on idle run exerted against surface 41 will not be sufficient to move plate 33 downwardly away from spacing means 9 against the bias of spring 34. Conditions equivalent to "idle" conditions in the fuel injector are thus provided.

While there have been hereinbefore described approved embodiments of this invention, it will be understood that many and various changes and modifications in form, arrangement of parts and details of construction thereof may be made without departing from the spirit of the invention, and that all such changes and modifications as fall within the scope of the appended claims are contemplated as a part of this invention.

What I claim is:

1. Apparatus to test the fuel pump of a compression-ignition engine for the purpose of adjusting a control rack comprising a housing, a spring-loaded valve therein openable in response to fuel pressure, a spacing means adjacent the valve and having a fuel passage therethrough, a first plate adjacent the spacing means and having a central bore and adjacent ducts extending therethrough for the passage of fuel therethrough, fuel pressure responsive means on the plate in the path of the fuel, a spring normally biasing the plate against the spacing means, the spring maintaining the plate in such position against idling fuel pressure upon the fuel pressure responsive means and yielding to allow the plate to separate from the spacing means under full load pressure against the fuel pressure responsive means thereby to permit the passage of fuel through the plate ducts, a chamber adjacent the first plate, and a second orifice having fuel passages therethrough adjacent the chamber.

2. Apparatus to test the fuel pump of a compression-ignition engine for the purpose of adjusting a control rack comprising a housing, a spring-loaded valve therein openable in response to fuel pressure, a spacing means adjacent the valve and having a fuel passage therethrough, a first plate adjacent the spacing means and having a central bore and adjacent ducts extending therethrough for the passage of fuel therethrough, fuel pressure responsive means on the plate in the path of the fuel, a spring normally biasing the plate against the spacing means so that its central bore is in communication with the spacing means fuel passage but its ducts are out of communication therewith, said spring maintaining the plate against the spacing means under idling fuel pressure against the fuel pressure responsive means and yielding to allow the plate to separate under full load pressure on the fuel pressure responsive means thereby to permit the passage of fuel through the ducts, a chamber adjacent the first plate, and a second plate having fuel passages therethrough adjacent the chamber.

3. Apparatus for testing the fuel pump of a compression ignition engine in order to adjust the control rack comprising a housing having a fuel responsive valve therein openable at a pressure equal to the pressure at which the injector valve opens, a first orifice plate adjacent the valve and having a central bore and adjacent ducts for the passage of fuel therethrough, a second fuel pressure responsive means on the plate in the path of the fuel, a spring normally biasing the plates apart and urging the first plate toward the first fuel pressure responsive means to block fuel from the adjacent ducts under idling fuel pressure and yielding upon fuel pressure on said second fuel pressure responsive means to allow the plate to separate from the first fuel pressure responsive means under full load pressure to permit the passage of fuel through said ducts, a chamber adjacent the first plate, and a second orifice plate having a fuel passage therethrough adjacent the chamber.

4. In testing apparatus of the type used to test the output of a fuel pump of a compression ignition engine for the purpose of adjusting a control rack, said apparatus having a housing with means therein simulating an injector and responsive to fuel pressure to permit passage of fuel therethrough, a unit comprising a first orifice plate adjacent the injector simulating means, said plate having a central bore and adjacent ducts extending therethrough for the passage of fuel, a second fuel pressure responsive means on the plate in the path of the fuel, a second orifice plate, a spring normally biasing the plates apart and urging the first plate toward the injector simulating means to prevent the passage of fuel through the adjacent ducts under idling fuel pressure, said spring being adapted to yield under fuel pressure upon said second fuel pressure responsive means to allow the plate to separate from the injector simulating means under full load pressure to permit the passage of fuel through said ducts, a chamber adjacent the first plate, said second orifice plate having a fuel passage therethrough adjacent the chamber.

References Cited in the file of this patent

UNITED STATES PATENTS

| Number | Name | Date |
|---|---|---|
| 1,833,080 | Kenworthy | Nov. 24, 1931 |
| 2,138,446 | Douredoure | Nov. 29, 1938 |
| 2,243,011 | L'Orange | May 20, 1941 |
| 2,303,532 | Ewart et al. | Dec. 1, 1942 |
| 2,558,979 | Pierce | July 3, 1951 |
| 2,560,870 | Hulick | July 17, 1951 |

FOREIGN PATENTS

| Number | Country | Date |
|---|---|---|
| 514,808 | Great Britain | Nov. 17, 1939 |